United States Patent
Lieske et al.

(10) Patent No.: US 11,820,671 B2
(45) Date of Patent: Nov. 21, 2023

(54) SOLID BODY HAVING DYEING PROPERTIES

(71) Applicant: Heubach GmbH, Langelsheim (DE)

(72) Inventors: Dieter Lieske, Goslar (DE); Maria Kubica, Goslar (DE); Stephan Blöss, Seesen (DE)

(73) Assignee: Heubach GmbH, Langelsheim (DE)

( * ) Notice: Subject to any disclaimer, the term of this patent is extended or adjusted under 35 U.S.C. 154(b) by 662 days.

(21) Appl. No.: 16/637,292

(22) PCT Filed: Aug. 9, 2018

(86) PCT No.: PCT/EP2018/071680
§ 371 (c)(1),
(2) Date: Feb. 7, 2020

(87) PCT Pub. No.: WO2019/030344
PCT Pub. Date: Feb. 14, 2019

(65) Prior Publication Data
US 2021/0147248 A1    May 20, 2021

(30) Foreign Application Priority Data
Aug. 10, 2017 (DE) .......... 10 2017 118 270

(51) Int. Cl.
*C01G 45/00* (2006.01)
*C01B 19/00* (2006.01)
*C09C 1/02* (2006.01)
*C09C 1/04* (2006.01)
*C09C 1/22* (2006.01)

(52) U.S. Cl.
CPC .......... *C01G 45/006* (2013.01); *C01B 19/002* (2013.01); *C09C 1/02* (2013.01); *C09C 1/04* (2013.01); *C09C 1/22* (2013.01); *C01P 2002/52* (2013.01)

(58) Field of Classification Search
CPC .................................................. C01G 45/006
See application file for complete search history.

(56) References Cited

U.S. PATENT DOCUMENTS

| 4,086,123 | A | 4/1978 | Hummel et al. |
| 5,198,025 | A | 3/1993 | Dausch |
| 7,264,671 | B2 * | 9/2007 | Binnewies ................ C09C 1/04 252/588 |

FOREIGN PATENT DOCUMENTS

| DE | 102006028454 | 12/2007 |
| JP | 2003221524 | 8/2003 |

OTHER PUBLICATIONS

English translation of International Search Report corresponding to International Patent Application No. PCT/EP2018/071680 (2 pages) (dated Oct. 29, 2018).
Deshmukh et al. "Structural, chemical and magnetic investigations of polycrystalline Zn1-xMnxO" Journal of Magnetism and Magnetic Materials, 322:536-541 (2010).
Saal et al. "Unusual Optical Properties of Mn-doped ZnO: The Search for a New Red Pigment—A Combined Experimental and Theoretical Study" Chemistry—A European Journal, 15:6408-6414 (2009).

* cited by examiner

*Primary Examiner* — William D Young
(74) *Attorney, Agent, or Firm* — Myers Bigel, P.A.

(57) ABSTRACT

The invention relates to a solid body of a compound of formula $Zn_{1-t-e}T_tE_eO_{1-y}Y_y$, wherein the compound has a wurtzite structure and wherein T represents one or more transition metals, selected from one or more of Mn, Cd, Cr, Fe, Co and Ni; E represents one or more alkaline earth metals, selected from one or more of Be, Mg, Ca, Sr and Ba; Y represents one or more chalcogens, selected from S, Se, Te; t is a value in the region of 0 to <1; e is a value from 0 to <1, and y is a value from 0 to <1.

18 Claims, No Drawings

SOLID BODY HAVING DYEING PROPERTIES

The invention relates to a solid body of formula $Zn_{1-t-e}T_tE_eO_{1-y}Y_y$. The present invention also relates to a method for producing such a solid body, and to the use of such a solid body as a colourant in plastics materials, paints and varnishes.

The term "pigments" denotes chromophoric substances which, in contrast to dyes, comprises particles and are practically insoluble in the application medium. Pigments may be divided into inorganic and organic pigments depending on their chemical structure. Typical fields of application of pigments are paints, varnishes, plastics materials and textiles.

Since in many, also technical products, increasing importance is being placed on the aesthetic properties, there is a strong need for pigments in a very wide range of shades. Besides a suitable shade of colour, modern pigments must satisfy ever-increasing demands in respect of toxicological safety and stability, and must be naturally economically efficient.

In the field of pigments that have an intense shade of red, pigments based on chromate and/or plumbate used to be very widespread. These pigments, however, have properties of toxicological concern and are therefore no longer usable nowadays for many applications. In the subsequent period, organic pigments with bright shades of red were used as replacement materials for these pigments. However, it has been found that these organic pigments are too unstable in various application systems. This leads in many applications to a fading of the shade of red by degeneration of the colourant, which leaves the products in question with an unfavourable appearance. More recently, inorganic pigments based on cerium have been developed as alternatives for pigments having bright shades of red. Pigments based on this element have satisfactory properties only to a limiting extent in respect of their colouring and their stability. However, these pigments are very costly, which limits their suitability for use in mass-produced articles.

On this basis, the object of the present invention was to provide solid bodies that enable a deep shade of red when used as colourant and at the same time have a high level of stability and good economical efficiency.

This aim is addressed in accordance with the invention by a solid body of a compound of formula $Zn_{1-t-e}T_tE_eO_{1-y}Y_y$, wherein the compound has a wurtzite structure, and wherein T represents one or more transition metals, selected from Mn, Cd, Cr, Fe, Co and Ni, E represents one or more alkaline earth metals, selected from Be, Mg, Ca, Sr and Ba, Y represents one or more chalcogens, selected from S, Se, Te, t is a value in the range of from 0 to <1, e is a value from 0 to <1, and t+e<1 y is a value from 0 to <1.

In a preferred embodiment T is present in the form of at least one of $Mn^{2+}$, $Cd^{2+}$, $Cr^{2+}$, $Fe^{2+}$, $Co^{2+}$ and $Ni^{2+}$.

In a preferred embodiment E is present in the form of at least one of $Be^{2+}$, $Mg^{2+}$, $Ca^{2+}$, $Sr^{2+}$ and $Ba^{2+}$.

In a preferred embodiment Y is present in the form of at least one of $S^{2-}$, $Se^{e-}$ and $Te^{e-}$.

The solid body according to the invention, when employed as a colourant, has colouristically useful shades of colour in the yellow>orange>red range. At the same time, the stability of this inorganic pigment is so high that even in the event of processing under high temperatures and/or with long storage times under adequate conditions, there is no fading of the pigment.

At the same time, the solid according to the invention has a high colouring power and can be produced economically, which makes the use much more economical in comparison to the previously known cerium-based red pigments.

In a preferred embodiment t is a value from 0.02 to 0.80, especially 0.05 to 0.65.

In a preferred embodiment e is a value from 0.00 to 0.85, especially 0.00 to 0.60.

In a preferred embodiment y is a value from 0.00 to 0.75, especially 0.00 to 0.70.

In a preferred embodiment T is in the form of Mn.

In a preferred embodiment E is in the form of Mg, Ca and/or Sr.

In a preferred embodiment Y is in the form of S.

In a preferred embodiment the invention relates to a solid body of a compound of formula $Zn_{1-t-e}T_tE_eO_{1-y}Y_y$, wherein the compound has a has a wurtzite structure, and wherein T represents one or more transition metals, selected from $Mn^{2+}$, $Cd^{2+}$, $Cr^{2+}$, $Fe^{2+}$, $Co^{2+}$ and $Ni^{2+}$, E represents one or more alkaline earth metals, selected from $Be^{2+}$, $Ca^{2+}$, $Sr^{2+}$ and $Ba^{2+}$, Y represents one or more chalcogens, selected from $S^{2-}$, $Se^{e-}$, $Te^{2-}$, t is a value in the range of from 0.05 o 0.65, e is a value from 0.00 to 0.60, and t+e<1 y is a value from 0.00 to 0.70.

In an especially preferred embodiment T is $Mn^{2+}$.

In an especially preferred embodiment Y is $S^{2-}$.

In a heavily preferred embodiment T is $Mn^{2+}$ and Y is $S^{2-}$.

In a preferred embodiment Y is in the form of a mixture of S and Se, especially in a molar ratio of S:Se in the range of from 1.00 to 0.00, especially 0.95 to 0.05.

In a preferred embodiment the solid body according to the invention is constructed in single-phase form.

The present invention also relates to a method for producing a solid body in a compound of formula $Zn_{1-t-e}T_tE_eO_{1-y}Y_y$.

In previously known methods for producing related inorganic pigments, a distinction is made between a dry process and a wet process.

In the production of such solid bodies by a dry process, the following approach is adopted: compounds of the particular base elements and, as applicable, of doping cations are well processed by means of dry mixers to form a homogeneous mixture. The resultant premix is calcined in suitable fuels at temperatures of 600-1300° C. The calcinate is generally micronised in aqueous phase or by means of a drying process optionally after prior crushing. The end product is examined in various application media in respect of stability and colouring.

In the production of such solid bodies by a wet process, the following approach is typically adopted: soluble compounds of the particular base elements and, as applicable, of doping cations are dissolved under stirring in water or, if necessary, in acid. By adjusting the pH value suitable for the precipitation of all raw materials, the used compounds are converted into their insoluble form. The precipitated solids are separated from the mother liquor by means of decanting or filtration, are washed salt-free, and are dried to a residual moisture of <2%. After pulverisation of the dry material, the resultant. premix is calcined in suitable fuels at temperatures of 600-1250° C. The calcinate is generally micronised in liquid phase or by means of a drying process—optionally after prior crushing. The end product is examined in various application media in respect of stability and colouring.

In accordance with the previous approach in the prior art, such solid bodies are thus produced either by a dry process, which is characterised by a homogenisation of the dry constituents in a dry mixer, or by a wet process, in which all constituents are firstly converted into an aqueous solution and are precipitated out therefrom by the setting of a suitable pH value.

The inventors have surprisingly found that especially advantageous properties can be attained by a combination of dry and wet process.

Accordingly, the present application relates to a method for producing a solid body in a compound of formula $Zn_{1-t-e}T_tE_eO_{1-y}Y_y$, wherein the compound has a wurtzite structure, and wherein T represents one or more transition metals, selected from Mn, Cd, Cr, Fe, Co and Ni, E represents one or more alkaline earth metals, selected from Be, Mg, Ca, Sr and Ba, Y represents one or more chalcogens, selected from S, Se, Te, t is a value in the range of from 0 to<1, e is a value from 0 to <1, and
+e<1 y is a value from 0 to <1, wherein the method comprises the following steps:

providing at least one compound which comprises at least one of the transition metals T, providing at least one compound which comprises at least one of the alkaline earth metals E, providing at least one compound which comprises at least one of the chalcogens Y, wherein at least one of the provided compounds is substantially water-insoluble and at least one of the provided compounds is substantially water-soluble; incorporating the at least one substantially water-insoluble compound in an aqueous medium;

dissolving the at least one substantially water-soluble compound in the aqueous medium;

changing a state, especially the pH value, of the aqueous medium, such that the at least one substantially water-insoluble compound is converted into at least one water-insoluble compound;

separating the solids from the aqueous medium by decanting, filtration or centrifugation;

calcining the separated solid.

In a preferred embodiment the present application relates to a method for producing a solid body in a compound of formula $Zn_{1-t-e}T_tE_eO_{1-y}Y_y$, wherein the compound has a wurtzite structure, and wherein T represents one or more transition metals, selected from Mn, Cd, Cr, Fe, Co and Ni, E represents one or more alkaline earth metals, selected from Be, Mg, Ca, Sr and Ba, Y represents one or more chalcogens, selected from S, Se, Te, t is a value in the range of from 0.05 to 0.65, e is a value from 0.00 to 0.60, and
t+e<1 y is a value from 0.00 to 0.70, wherein the method comprises the following steps:

providing at least one compound which comprises at least one of the transition metals T;

providing at least one compound which comprises at least one of the alkaline earth metals E;

providing at least one compound which comprises at least one of the chalcogens Y;

wherein at least one of the provided compounds is substantially water-insoluble and at least one of the provided compounds is substantially water-soluble;

incorporating the at least one substantially water-insoluble compound in an aqueous medium;

dissolving the at least one substantially water-soluble compound in the aqueous medium;

changing a state, especially the pH value, of the aqueous medium, such that the at least one substantially water-insoluble compound is converted into at least one water-insoluble compound;

separating the solids from the aqueous medium by decanting, filtration or centrifugation;

calcining the separated solid.

In an especially preferred embodiment T is $Mn^{2+}$.

In an especially preferred embodiment Y is $S^{2-}$.

In a heavily preferred embodiment T is $Mn^{2+}$ and Y is $S^{2-}$.

Compared to the previously known methods for producing such solid bodies, that is to say the above-described wet methods or the above-described dry methods, the method according to the invention has the following advantages:

It has been found that in the case of production of the solid bodies according to the invention by the wet method, an extremely homogeneous mixing of the constituents is achieved. However, a disadvantage of the wet method is that a certain percentage of the starting substances remain in the aqueous medium. This leads to higher raw material costs and to a problem with regard to wastewater, since the starting compounds remaining in the aqueous medium are partly toxic and the water therefore has to be treated in a complex process. In the case of production of the solid bodies according to the invention by the dry method, there are no problems with regard to wastewater, however it has been found that in some instances complete homogeneity of the solid bodies can be achieved only with great difficulty.

It has been found that, by way of the method according to the invention, the advantages of the wet method and the dry method can be combined. The method according to the invention thus leads to a saving of raw material costs and to a reduction of the wastewater load as compared to the wet method, whereas it achieves an improved homogeneity of the solid bodies as compared to the dry method.

The present invention also relates to the use of the described solid bodies as a colourant in various sectors. The use according to the invention especially preferably concerns the use as a colouring agent in plastics materials, paints and varnishes.

Especially, the use of the solids according to the invention as colourants in plastics materials has proven to be advantageous. The background for this is that such coloured plastics material articles are often produced by way of injection moulding, which is associated with a relatively high thermal loading of the pigment embedded in the plastics material mass. In the case of the organic colour pigments known from the prior art having shades of deep red, this thermal loading often leads to a fading of the red shade as a result of degradation of the colourant. This disadvantage is avoided by the pigments according to the invention, wherein at the same time the economical disadvantages of the cerium-based red pigments already known are avoided.

The present invention will be explained in greater detail on the basis of the following example:

EXAMPLE

A suspension of 48.81 g zinc oxide (NORKEM) in 610 ml demineralised water was prepared in a 2 l glass beaker under stirring. 20.28 g manganese sulfate monohydrate (commercially, CG-Chemikalien) dissolved in 300 ml demineralised water were added within 5 minutes. The mixture was stirred for 20 minutes. The pH was set to 7.4 using 5% NaOH. A solution of 33,12 sodium sulfide nonahydrate (32.5% $Na_2S$, Merck) in 270 ml demineralised water was added dropwise within 10 minutes under stirring. 8.76 g calcium carbonate (ALDRICH, >99.0%) were stirred in. The mixture was stirred for 30 minutes and left to stand overnight. The precipitate was separated off using a Buchner funnel, and the filter cake was washed salt-free and pH-neutral. The press cake was dried in a drying cabinet at 80° C., then pulverised by means of a laboratory mill.

The resultant raw mixture was calcined in aluminium oxide dishes (GTS) in a nitrogen atmosphere for example 4.6 in a tube reactor (HTM Reetz GmbH) at 1080° C. The reaction time was 120 minutes.

The calcinate was micronised in an aqueous medium by means of an agitator bead mill (Mini mill, EIGER TORRANCE). The ground material was evaporated to dryness and pulverised by means of an ultra-centrifugal mill (ZM 200, RETSCH). An orange-red powder with low hardness was produced.

The product was finely ground in a medium-oil air-drying alkyd varnish by means of a universal mixer (Hauschild). After application of the pigmented varnish to substrate sheet 103 (VOLKEL), the shade of colour was assessed visually and by means of spectral photometer. Chromophoric properties and stabilities were determined by further tests in other varnish systems, different plastics materials and façade coatings.

The invention claimed is:

1. A method for producing a solid body of a compound of formula $Zn_{1-t-e}T_tE_eO_{1-y}Y_y$, wherein the method comprises the following steps:
   providing at least one compound which comprises at least one of the transition metals T,
   providing at least one compound which comprises at least one of the alkaline earth metals E,
   providing at least one compound which comprises at least one of the chalcogens Y,
   wherein at least one of the provided compounds is substantially water-insoluble and at least one of the provided compounds is substantially water-soluble,
   incorporating the at least one substantially water-insoluble compound in an aqueous medium,
   dissolving the at least one substantially water-soluble compound in the aqueous medium,
   changing a state of the aqueous medium, such that the at least one substantially water-soluble compound is converted into at least one water-insoluble compound, and
   separating the solids from the aqueous medium by decanting, filtration or centrifugation, calcining the separated solid,
   thereby providing the solid body of the compound of formula $Zn_{1-t-e}T_tE_eO_{1-y}Y_y$, wherein the compound has a wurtzite structure, and wherein
   T represents one or more transition metals selected from Mn, Cd, Cr, Fe, Co and Ni,
   E represents one or more alkaline earth metals selected from Be, Mg, Ca, Sr and Ba,
   Y represents one or more chalcogens selected from S, Se, Te,
   t is a value in the range of from greater than 0 to <1,
   e is value from greater than 0 to <1,
   t+e<1, and
   y is a value from greater than 0 to <1.

2. The method according to claim 1, wherein t is a value from 0.02 to 0.80.

3. The method according to claim 1, wherein e is a value from greater than 0.00 to 0.85.

4. The method according to claim 1, wherein y is a value from greater than 0.00 to 0.75.

5. The method according to claim 1, wherein T is Mn.

6. The method according to claim 1, wherein E is Mg, Ca and/or Sr.

7. The method according to claim 1, wherein Y is S.

8. The method according to claim 1, wherein Y is a mixture of S and Se.

9. The method according to claim 1, wherein the solid body is single-phase.

10. A solid body produced in accordance with the method according to claim 1.

11. A composition comprising the solid body according to claim 10.

12. The composition of claim 11, wherein the composition is a plastics material, paint, or varnish.

13. The method of claim 1, wherein changing the state of the aqueous medium comprises changing the pH value of the aqueous medium.

14. The method of claim 1, wherein t is a value from 0.05 to 0.65.

15. The method of claim 1, wherein e is a value from greater than 0.00 to 0.60.

16. The method of claim 1, wherein y is a value from greater than 0.00 to 0.70.

17. The method of claim 1, wherein Y is a mixture of S and Se that has a molar ratio of S:Se in a range of from 1.00 to greater than 0.00.

18. The method of claim 1, wherein Y is a mixture of S and Se that has a molar ratio of S:Se in a range of from 0.95 to 0.05.

* * * * *

UNITED STATES PATENT AND TRADEMARK OFFICE
CERTIFICATE OF CORRECTION

PATENT NO. : 11,820,671 B2
APPLICATION NO. : 16/637292
DATED : November 21, 2023
INVENTOR(S) : Lieske et al.

It is certified that error appears in the above-identified patent and that said Letters Patent is hereby corrected as shown below:

On the Title Page

Column 2, (57) Abstract Line 8: Please correct "tis" to read --t is--

In the Specification

Column 1, Line 63: Please correct "$Se^{e-}$ and $Te^{e-}$." to read --$Se^{2-}$ and $Te^{2-}$.--

Column 2, Line 24: Please correct "$Be^{2+}$, $Ca^{2+}$," to read --$Be^{2+}$, $Mg^{2+}$, $Ca^{2+}$,--

Column 2, Line 26: Please correct "$Se^{e-}$," to read --$Se^{2-}$,--

Column 3, Line 25: Please correct "+e<1" to read --t + e < 1--

Column 5, Line 10: Please correct "Buchner" to read --Büchner--

Column 5, Line 27: Please correct "(VOKEL)" to read --(VÖKEL)--

Signed and Sealed this
Twenty-sixth Day of March, 2024

Katherine Kelly Vidal
*Director of the United States Patent and Trademark Office*